(12) United States Patent
Schuh et al.

(10) Patent No.: US 12,539,723 B2
(45) Date of Patent: Feb. 3, 2026

(54) TRAILER HITCH ASSEMBLY WITH A SENSOR

(71) Applicant: Dexter Axle Company LLC, Elkhart, IN (US)

(72) Inventors: Eric Joseph Schuh, Stevensville, MI (US); Ruben Gonzalez Sanchez, Elkhart, IN (US); Samuel Neil Lievore, Elkhart, IN (US); Jason R. Harper, Spanish Fork, UT (US); Matthew D. Barnes, Lehi, UT (US); Jed K. Anderson, Lindon, UT (US)

(73) Assignee: Dexter Axle Company LLC, Elkhart, IN (US)

( * ) Notice: Subject to any disclaimer, the term of this patent is extended or adjusted under 35 U.S.C. 154(b) by 468 days.

(21) Appl. No.: 18/309,606

(22) Filed: Apr. 28, 2023

(65) Prior Publication Data

US 2024/0359514 A1    Oct. 31, 2024

(51) Int. Cl.
*B60D 1/24* (2006.01)
*B60D 1/06* (2006.01)

(52) U.S. Cl.
CPC .............. *B60D 1/248* (2013.01); *B60D 1/06* (2013.01)

(58) Field of Classification Search
CPC ................................. B60D 1/248; B60D 1/06
See application file for complete search history.

(56) References Cited

U.S. PATENT DOCUMENTS

| | | | |
|---|---|---|---|
| 5,149,121 A * | 9/1992 | Hafner | B60D 1/248 |
| | | | 280/446.1 |
| 9,643,462 B2 | 5/2017 | McAllister | |
| 9,796,227 B2 | 10/2017 | McAllister | |
| 10,596,869 B2 | 3/2020 | McAllister | |
| 10,625,547 B2 | 4/2020 | McAllister | |
| 10,759,241 B2 | 9/2020 | McAllister | |
| 11,267,301 B2 * | 3/2022 | McAllister | B60D 1/46 |
| 12,134,287 B1 * | 11/2024 | McAllister | G01L 5/136 |
| 12,151,525 B1 * | 11/2024 | McAllister | B60D 1/248 |
| 12,194,795 B2 * | 1/2025 | McAllister | G01G 19/02 |
| 2020/0384817 A1 | 12/2020 | Anderson et al. | |
| 2021/0053404 A1 | 2/2021 | McAllister | |
| 2021/0170818 A1 | 6/2021 | Doman et al. | |
| 2021/0170819 A1 | 6/2021 | Doman et al. | |
| 2022/0250424 A1 | 8/2022 | McAllister et al. | |
| 2022/0363096 A1 | 11/2022 | Doman et al. | |

* cited by examiner

*Primary Examiner* — Kevin Hurley
(74) *Attorney, Agent, or Firm* — McGarry Bair PC

(57) ABSTRACT

A trailer hitch assembly is configured for coupling a trailed vehicle with a motor vehicle. The trailer hitch assembly includes a hitch body at least partially defining an interior cavity configured for selectively receiving a hitch ball. A scale assembly is at least partially provided within the interior cavity and has a movable position indicator with an indicator pin extending exteriorly of the interior cavity. A sensor assembly is provided with the hitch body.

20 Claims, 8 Drawing Sheets

TRAILER HITCH ASSEMBLY WITH A SENSOR

BACKGROUND

Contemporary approaches for towing trailed vehicles, such as trailers, caravans, campers, or recreational vehicles (RVs), by a towing vehicle, such as a truck or other suitable motor vehicle, include the use of trailer hitch assemblies of various designs. Such trailer hitch assemblies include a hitch body and a hitch ball or tow ball. Trailed vehicles include a chassis or frame and at least one axle carrying at least one pair of wheels for supporting the chassis. A tongue extends from the chassis for coupling with the trailer hitch assembly. Specifically, the tongue includes or defines a hemispherical socket that fits over the hitch ball to allow the trailed vehicle attached to the trailer hitch assembly to be freely movable in orientation with respect to the towing vehicle to which the trailed vehicle is attached.

Knowing the weight of the trailed vehicle and its payload are important for towing, such as for ensuring that weight capacity limits of the towing vehicle, the trailer hitch assembly, and the trailed vehicle are not exceeded. Further, trailed vehicles can include components, elements, or operational parameters that can be set or customized for optimal performance based on the weight of the trailed vehicle and its payload. By way of non-limiting example, in cases where the trailed vehicle to be towed includes its own brakes, knowing the weight of the trailed vehicle and its payload is useful so the proper proportioning of the brakes of the trailed vehicle can be set. Some systems require significant user intervention to determine a weight of the trailed vehicle and its payload. As such, it is desirable to provide a system for determining a weight of a trailed vehicle and its payload without user intervention.

BRIEF DESCRIPTION

An aspect of the present disclosure relates to a trailer hitch assembly configured for coupling a trailed vehicle with a motor vehicle, the trailer hitch assembly comprising a hitch body at least partially defining an interior cavity configured for selectively receiving a hitch ball, a scale assembly at least partially provided within the interior cavity and having a movable position indicator with an indicator pin extending exteriorly of the interior cavity, and a sensor assembly provided with the hitch body and configured for detecting a position of the indicator pin and providing an output indicative of the position of the indicator pin.

Another aspect of the present disclosure relates to a weight sensing assembly for use with a trailer hitch assembly configured for coupling a trailed vehicle with a motor vehicle and having a hitch body receiving a hitch ball and a scale assembly including a movable position indicator, the weight sensing assembly comprising a sensor assembly coupled with the hitch body and configured for detecting a position of the movable position indicator and providing an output indicative of the position of the movable position indicator, and a controller configured for receiving the output indicative of the position of the movable position indicator and determining a weight applied to the hitch ball based on the output indicative of the position of the movable position indicator.

Yet another aspect of the present disclosure relates to a method of sensing a weight of a trailed vehicle coupled with a motor vehicle via a trailer hitch assembly, the method comprising coupling the trailed vehicle with a hitch ball movably received within a hitch body of the trailer hitch assembly and operably coupled with a position indicator that is movable within the hitch body by weight applied to the hitch ball, sensing, by a sensor assembly provided with the hitch body, a position of the movable position indicator, providing, from the sensor assembly, an output indicative of the position of the movable position indicator, and determining, by a controller, a weight applied to the hitch ball based on the output indicative of the position of the movable position indicator.

DETAILED DESCRIPTION

Figure 1:
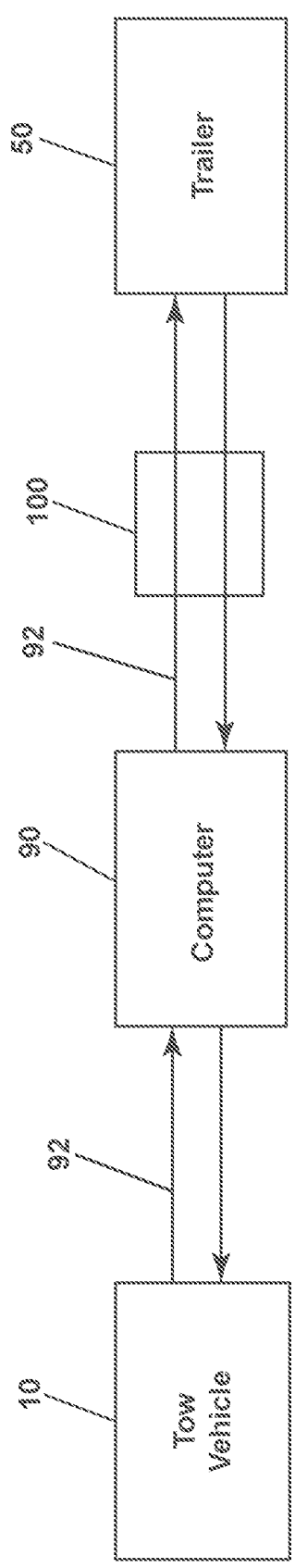
FIG. 1 is a schematic block diagram of a tow vehicle coupled with a trailed vehicle, illustrated herein as a trailer, by a trailer hitch assembly and having systems and components for operably coupling the tow vehicle and the trailer.

FIG. 1 schematically illustrates a motor vehicle, illustrated herein as a tow vehicle 10, capable of towing a trailed vehicle, illustrated herein as a trailer 50. It will be understood that the present disclosure is applicable to any suitable type of motor vehicle capable of towing the trailer 50, non-limiting examples of which include automobiles, trucks, sports utility vehicles (SUVs), or semi cabs having varying configurations, sizes, and towing capacities. Further, it will be understood that the present disclosure is applicable to any suitable type of trailed vehicle, non-limiting examples of which include cargo trailers, utility trailers, other types of trailers, caravans, campers, RVs, or other pull-behind vehicles having varying configurations, sizes, and weights. The tow vehicle 10 and trailer 50 share many features of conventional vehicles and trailers, respectively, which may not be described in detail herein, except as necessary for a complete understanding of aspects of the present disclosure.

Operational and electrical systems of the tow vehicle 10 can send signals 92 to various components on the trailer 50, such as in response to actions taken by the tow vehicle 10 or by controllers in the tow vehicle 10. Such signals 92 may be passed through a device, such as a computer 90, that can be used to read and transmit the signals 92. The computer 90 can be integrated into the tow vehicle 10 or be located on the trailer 50.

The trailer 50 is configured to be selectively operably coupled to the tow vehicle 10 via a trailer hitch assembly 100. The trailer hitch assembly 100 is configured to allow the trailer 50 attached to the trailer hitch assembly 100 to be freely movable in orientation with respect to the trailer hitch assembly 100 and to the tow vehicle 10 to which the trailer hitch assembly 100 is attached. The trailer hitch assembly 100 can additionally electrically couple the tow vehicle 10 and the trailer 50, such that the signals 92 transmitted between the tow vehicle 10 and the trailer 50 can be passed through the trailer hitch assembly 100.

Figure 2:
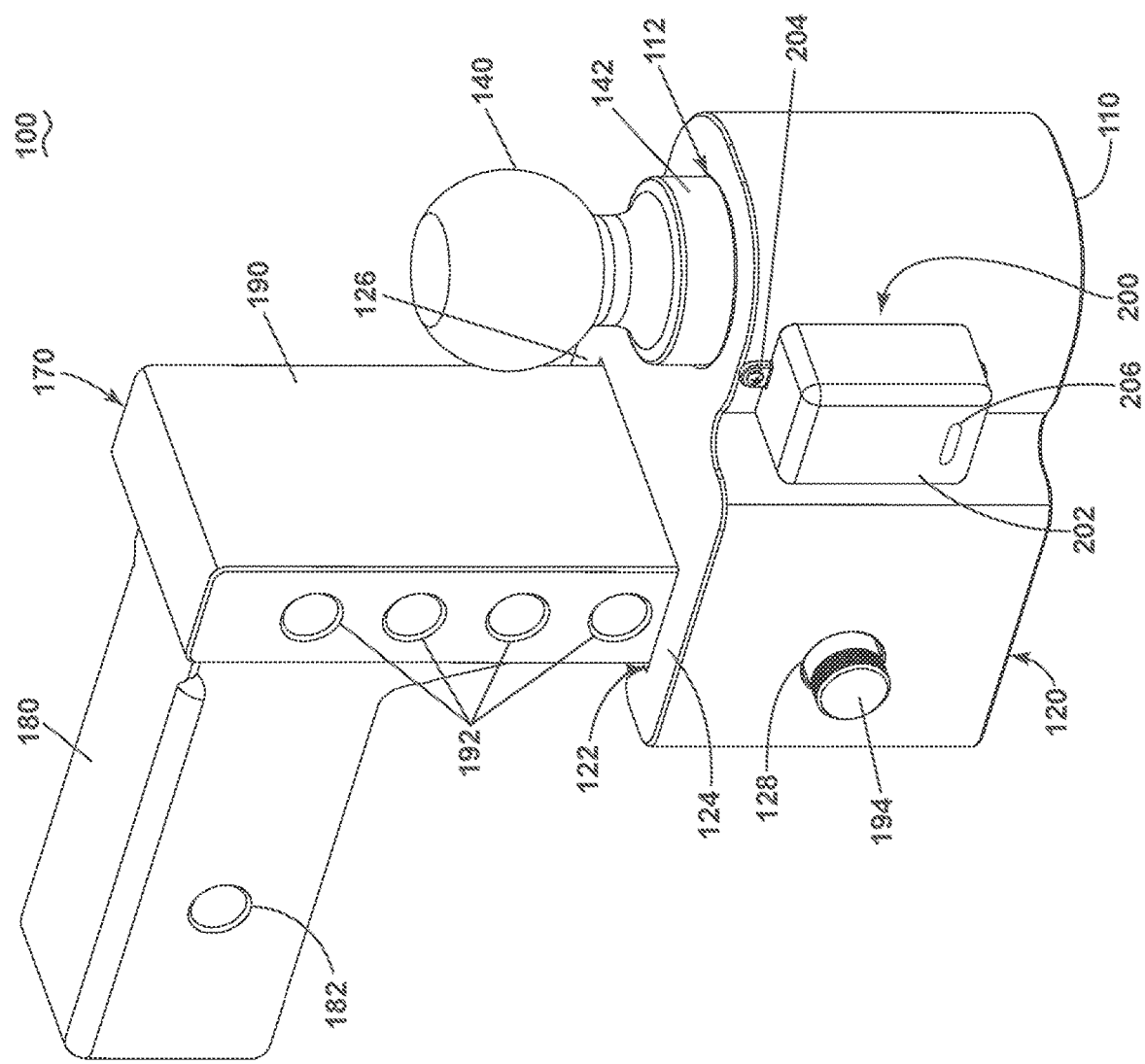
FIG. 2 is a perspective view of a trailer hitch assembly for use with the tow vehicle and trailer of FIG. 1 and including a hitch body, an example of a hitch ball, and an example of a sensor assembly.

Turning to FIG. 2, the trailer hitch assembly 100 comprises a hitch body 110 at least partially defining an interior cavity 112 that is configured for selectively receiving a hitch ball 140, and a height adjuster 170. The hitch body 110 can further define a mounting portion 120 extending outwardly from the main hitch body 110. The mounting portion 120 comprises first and second arms 124, 126 spaced apart from one another to at least partially define a mounting channel 122. Each of the first and second arms 124, 126 includes at least one mounting opening 128.

The hitch ball 140 extends upwardly from a hitch ball body 142 such that the hitch ball 140 protrudes upwardly out of the interior cavity 112 when the hitch ball 140 is at least partially received within the interior cavity 112. Thus, the hitch ball 140 is exposed outside of the interior cavity 112 when the hitch ball body 142 is at least partially received within the interior cavity 112. While the hitch ball 140 is illustrated as being completely exposed outside of the interior cavity 112 when the hitch ball body 142 is at least partially received within the interior cavity 112, it will be understood that the hitch ball 140 could instead be only partially exposed outside of the interior cavity 112. The hitch ball 140 can have any suitable diameter for coupling with standard trailers 50, non-limiting examples of which include diameters of 1⅞ inches, 2 inches, or 2¼ inches.

The height adjuster 170 couples the hitch body 110 with the tow vehicle 10 and is configured to allow for adjustment of the height or clearance of the trailer hitch assembly 100 for use with trailers 50 of varying heights and varying ground clearances. The height adjuster 170 comprises a mounting arm 180 and an adjusting arm 190. By way of non-limiting example, the mounting arm 180 and the adjusting arm 190 are positioned orthogonally with respect to one another, though it will be understood that other angular positions of the mounting arm 180 and the adjusting arm 190 can be used.

The mounting arm 180 is configured to be received within a hitch mount (not shown) of the tow vehicle 10 and defines openings 182 through which a fastener (not shown) can extend to attach the mounting arm 180 to the hitch mount of the tow vehicle 10.

The adjusting arm 190 is configured to be movably received within the mounting channel 122. The adjusting arm 190 defines a plurality of adjusting openings 192 that can be used to adjust the height of the trailer hitch assembly 100, and particularly of the hitch body 110 and the hitch ball 140, relative to the tow vehicle 10. Depending on the desired height of the trailer hitch assembly 100 for coupling with various trailers 50, a user can select the desired height by aligning one of the adjusting openings 192 with the mounting openings 128 on the first and second arms 124, 126. For example, if a lower position of the hitch ball 140 is desired, a lower pair of the adjusting openings 192 can be aligned with the mounting openings 128. However, if a higher position of the hitch ball 140 is desired, an upper pair of the adjusting openings 192 can be aligned with the mounting openings 128. When the desired position of the hitch body 110 and hitch ball 140 are selected, a fastener, illustrated herein as a pin 194 can be inserted through the mounting openings 128 and through the adjusting openings 192 to mount the hitch body 110 to the height adjuster 170.

The trailer hitch assembly 100 further comprises a sensor assembly 200 provided with the hitch body 110 and comprising a sensor housing 202. As illustrated, the sensor housing 202 can be mounted on the hitch body 110, such as by at least one fastener 204. Alternatively, it is contemplated that the sensor housing 202 can be integrally formed with the hitch body 110. Optionally, the sensor assembly 200 further comprises a display 206 provided on the sensor housing 202. The display 206 can be any suitable type of display, such as, by way of non-limiting example, a graphic organic light-emitting diode (OLED) display. The location or position of the display 206 on the sensor housing 202 is not limiting, and it will be understood that the display 206 can be provided at any suitable portion of the sensor housing 202.

Figure 3:
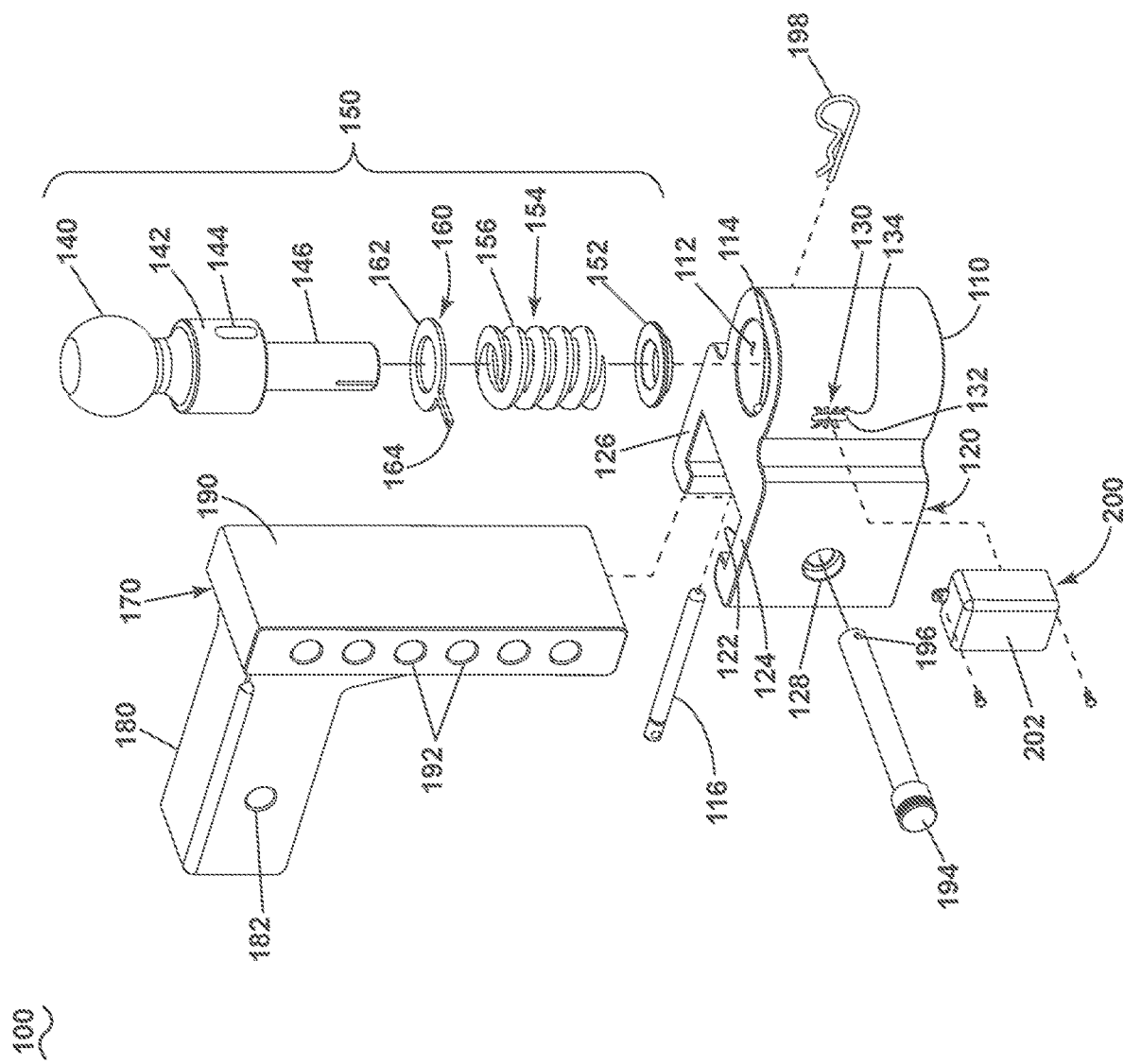
FIG. 3 is an exploded perspective view of the trailer hitch assembly of FIG. 2.

Turning now to FIG. 3, it can be better seen that the interior cavity 112 of the hitch body 110 includes a fastener opening 114 defined in the hitch body 110 and configured to selectively receive a fastener, illustrated herein as a pin 116. Further, the hitch body 110 includes an indicia 130 that is positioned in alignment with the sensor assembly 200, such that at least a portion of the sensor housing 202 covers at least a portion of the indicia 130 when the sensor housing 202 is attached to the hitch body 110. The indicia 130 comprises a side wall opening 132 in the hitch body 110 that is aligned with at least a portion of the sensor housing 202. In one example, the entirety of the side wall opening 132 is received within the position and dimensions of the sensor housing 202. The indicia 130 can also include a visual indicator, such as a scale 134 of estimated weight values, provided on the hitch body 110. While the scale 134 is illustrated herein as being positioned adjacent the side wall opening 132, it is also contemplated that the scale 134 can be spaced from the side wall opening 132 on the hitch body 110, such that the scale 134 is visible to a user outside of the sensor housing 202.

The exploded view illustrates that the pin 194 for mounting the hitch body 110 to the height adjuster 170 further includes a pin opening 196 at a distal end of the pin 194, such that the pin opening 196 extends beyond both the first and second arms 124, 126 when the pin 194 is fully inserted through the mounting openings 128. A suitable fastener, illustrated herein as a cotter pin 198 can be inserted through the pin opening 196 to fasten the pin 194 to the mounting portion 120, and in turn to fix the hitch body 110 to the height adjuster 170.

While the hitch ball 140 extends upwardly from the hitch ball body 142, a hitch ball stem 146 extends downwardly from the hitch ball body 142, opposite the hitch ball 140. The hitch ball body 142 also defines a fastener opening 144 configured to selectively receive the pin 116 for securing the hitch ball 140 to the hitch body 110 and for securing the hitch ball body 142 within the interior cavity 112.

The trailer hitch assembly 100 further comprises a weight sensing assembly, illustrated herein as a scale assembly 150 that is at least partially provided within the interior cavity 112. The scale assembly 150 comprises an end cap 152 provided within a bottom of the interior cavity 112, a compressible element 154 supported by the end cap 152 within the interior cavity 112, and a movable position indicator 160 overlying and supported by the compressible element 154. The compressible element 154 is illustrated herein as comprising a spring 156, though it will be understood that other types of compressible elements 154 can be used, such as a hydraulic assembly.

The movable position indicator 160 rests atop the spring 156, such that the movable position indicator 160 moves generally vertically within the interior cavity 112 as the spring 156 is compressed or decompressed. The movable position indicator 160 comprises a ring-shaped body 162 from which an indicator pin 164 extends radially outwardly. The movable position indicator 160 is oriented within the interior cavity 112 such that the indicator pin 164 extends from the interior cavity 112 to pass through the side wall opening 132 in the hitch body 110 to the exterior of the interior cavity 112 and of the hitch body 110.

The movable position indicator 160 and the spring 156 are sized and positioned such that the hitch ball stem 146 can extend through the ring-shaped body 162 and at least partially through the spring 156 when the hitch ball body 142 is received within the interior cavity 112. The hitch ball body 142 is configured to rest upon the movable position indicator 160, the movable position indicator 160 in turn resting upon the spring 156, such that the spring 156 is selectively compressible by weight applied to the hitch ball 140, as the weight is in turn applied to the movable position indicator 160 and the spring 156. Therefore, as the spring 156 is compressed by weight applied to the hitch ball 140, the height of the spring 156 within the interior cavity 112 is reduced, and thus also the movable position indicator 160, including the indicator pin 164, due to resting upon the spring 156, is moved vertically downwardly within the interior cavity 112. Conversely, the movable position indicator 160, including the indicator pin 164, is moved vertically upwardly within the interior cavity 112 as the spring 156 is decompressed by weight being removed from the hitch ball 140. Therefore, the scale assembly 150 can be thought of as further comprising the hitch ball 140, with the scale assembly 150 configured for sensing a weight applied to the hitch ball 140.

As the indicator pin 164 of the movable position indicator 160 extends exteriorly of the interior cavity 112 through the side wall opening 132, movement of the movable position indicator 160 within the interior cavity 112 also produces movement of the indicator pin 164 relative to the side wall opening 132. To accommodate this movement of the indicator pin 164, it is understood that the side wall opening 132 is sized sufficiently for the maximal extent of vertical sliding movement, both upward and downward, of the indicator pin 164 within the side wall opening 132. By way of non-limiting example, the side wall opening 132 has an oblong shape and is generally vertically oriented on the hitch body 110 such that the indicator pin 164 moves vertically within the height of the side wall opening 132 as the spring 156 is compressed or decompressed by weight applied to or removed from the hitch ball 140.

The vertical position of the indicator pin 164 within and relative to the side wall opening 132 can be used as an indicator or measure of weight applied to the hitch ball 140. In one non-limiting example, in the case that the scale 134 of estimated weights is spaced from the side wall opening 132, such that it is visible to a user outside the sensor housing 202, it is further contemplated that the sensor housing 202 can include a transparent portion or window aligned with the side wall opening 132, such that the position of the indicator pin 164 within the side wall opening 132 is visible to a user through the sensor housing 202 and slidable along the scale 134. The user can view the position of the indicator pin 164 adjacent the scale 134 of estimated weights in order to read an estimated weight applied to the hitch ball 140 based on what number in the scale 134 of estimated weights that the indicator pin 164 is aligned with.

Figure 4:
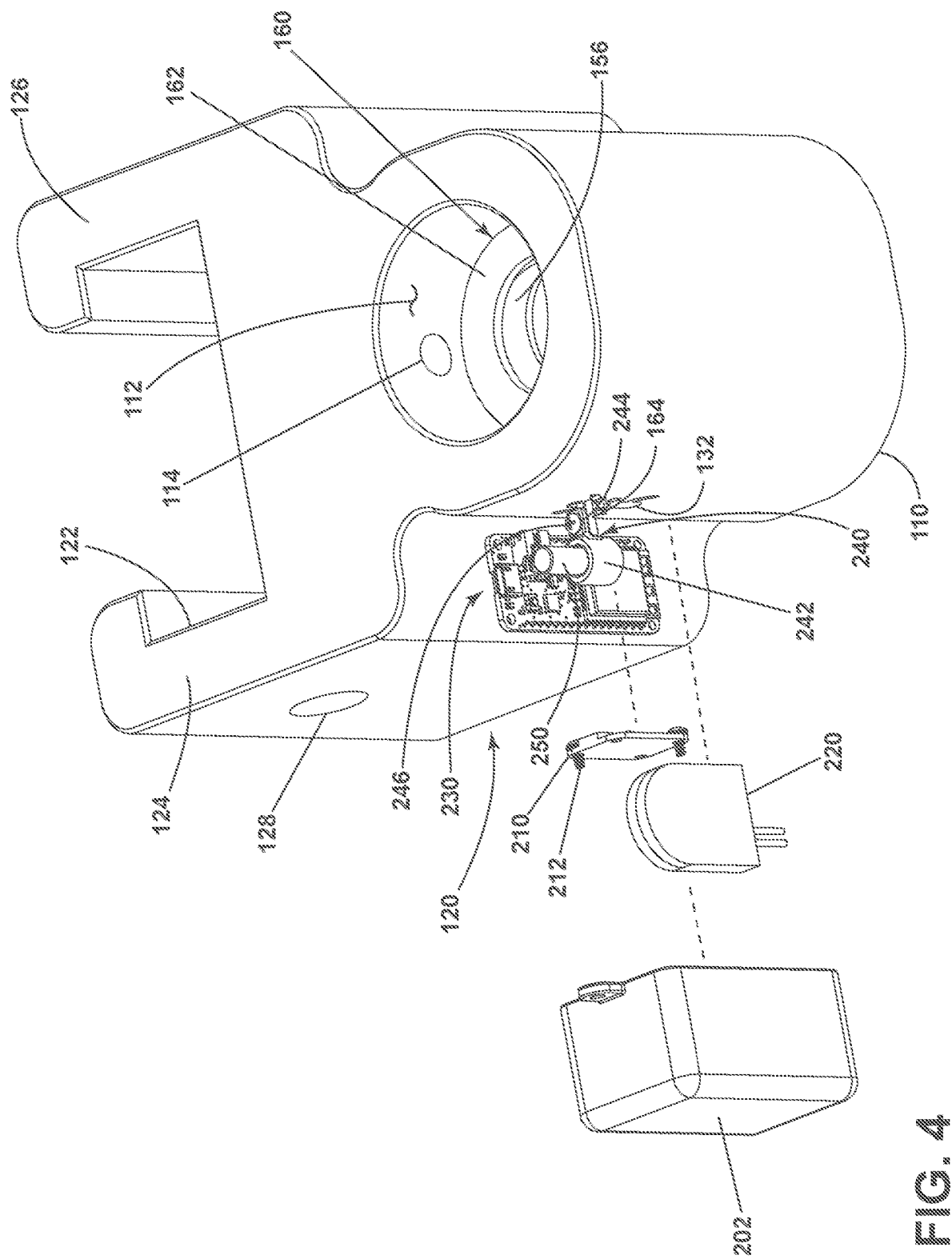
FIG. 4 is an enlarged and partially exploded perspective view of a portion of the trailer hitch assembly of FIG. 2, including the hitch body and the sensor assembly.

Turning now to FIG. 4, the sensor assembly 200 is partially exploded to illustrate that the indicator pin 164 extends through the side wall opening 132 and into an interior defined by the sensor housing 202. Thus, as the indicator pin 164 moves vertically within the height of the side wall opening 132, the indicator pin 164 likewise moves vertically within the height of the sensor housing 202. The vertical position of the indicator pin 164 within and relative to the sensor assembly 200 can be used as an indicator or measure of weight applied to the hitch ball 140. A carrier 240 within the sensor housing 202 is coupled to and carried by the indicator pin 164 such that the carrier 240 is movable within the sensor housing 202 as the movable position indicator 160 moves vertically within the interior cavity 112. The carrier 240 comprises a bucket 242 and a flange 244 extended outwardly from the bucket 242. The flange 244 is coupled to and carried by the indicator pin 164, such as by a fastener 246.

At least one magnet 250 is at least partially received within the bucket 242 to move upwardly and downwardly within the sensor housing 202 with the carrier 240 as the carrier 240 is moved by the indicator pin 164. By way of non-limiting example, the magnet 250 can be retained within the bucket 242 by a press fit or interference fit, though it will be understood that the magnet 250 can also be retained within the bucket 242 by any suitable retaining method or mechanism, or that the magnet 250 rests within the bucket 242 by gravity and without any additional retaining method or mechanism.

The sensor assembly 200 further comprises a magnet sensor 210 configured for detecting a position of the magnet 250 relative to the magnet sensor 210, a battery 220, such as a button battery 220, and a printed circuit board (PCB) 230 all received within the sensor housing 202. While the illustrated example shows the magnet sensor 210, the battery 220, and the PCB 230 as separate pieces contained within the sensor housing 202, it is understood that this arrangement is not limiting and, alternatively, at least one of the magnet sensor 210 and the battery 220, or both the magnet sensor 210 and the battery 220, can be provided with, directly coupled to, and/or carried by the PCB 230 as a single, combined part. In one such non-limiting example, both the magnet sensor 210 and the battery 220 are provided on and as a part of the PCB 230, such that the PCB 230 comprises the magnet sensor 210 and the battery 220, and can be thought of as a magnet sensor PCB 230 and/or as a microcontroller for the magnet sensor 210.

By way of non-limiting example, the magnet sensor 210 can comprise a magnetometer configured for detecting magnets and magnetic orientation, though it will be understood that any suitable type of magnet sensor 210 can be used. The magnet sensor 210 can be fastened to the sensor housing 202, such as by the use of fasteners 212. As the magnet 250 is carried by and moves with the indicator pin 164 and the magnet sensor 210 detects a position of the magnet 250, the magnet sensor 210 is therefore also configured for detecting a position of the indicator pin 164 and provides an output indicative of the position of the indicator pin 164. In this way, the sensor assembly 200 is configured for detecting a position of the movable position indicator 160 via the indicator pin 164. While the position of the indicator pin 164 that is detected by the magnet sensor 210 is primarily described herein as a vertical or substantially vertical position of the indicator pin 164, it will be understood that this is not limiting and it is also contemplated that the magnet sensor 210 can alternatively or additionally detect an angular position of the indicator pin 164.

In one example, the magnet sensor 210 can provide the output indicative of the position of the indicator pin 164 to the PCB 230 such that the PCB 230 functions as a controller for the sensor assembly 200, and therefore also for the trailer hitch assembly 100, to receive the output indicative of the position of the indicator pin 164. In another example, the trailer hitch assembly 100 comprises a separate controller (not shown), different from the PCB 230, such that the PCB 230 receives the output indicative of the position of the indicator pin 164 and, in turn, provides the output to the separate controller. Alternatively, the magnet sensor 210 can provide the output indicative of the position of the indicator pin 164 directly to the separate controller, without going through the PCB 230. By way of non-limiting example, such a separate controller can comprise a controller that is still associated with the trailer hitch assembly 100, but is not the PCB 230 itself, a controller provided with the trailer 50 itself, rather than with the trailer hitch assembly 100, or the controller can be the computer 90 of the tow vehicle 10, etc.

Regardless of whether the controller is the PCB 230, is provided with the trailer hitch assembly 100, but separate from the PCB 230, is provided with either the tow vehicle 10 or the trailer 50, or is provided completely separate and remote from the trailer hitch assembly 100, the controller is configured to receive the output indicative of the position of the indicator pin 164 and to use the output to estimate or determine a weight applied to the hitch ball 140 by the trailer 50, based on the vertical movement of the movable position indicator 160 as represented by the detected position of the indicator pin 164. Further, in one non-limiting example, the controller can be configured to make the estimation or determination of weight applied to the hitch ball 140 based not solely on the output from the magnet sensor 210, but also taking into account various other relevant data or parameters, which may be sensed, programmed at manufacture, or input by a user, non-limiting examples of which can include the size and strength or resistance of the spring 156, a height of the position of the hitch body 110, a size or height of the trailer 50, the number and distribution of the axles on the trailer 50, the inclusion of shocks or other hydraulic elements with the trailer 50, or a variety of other factors that can affect the proportion of the total weight of the trailer 50 and its payload that is applied to the hitch ball 140.

The controller or PCB 230 can then provide the determined weight being applied to the hitch ball 140 to an information network or server, such as a cloud, to a telematics device, and/or to be presented to a user by a suitable display. By way of non-limiting example, such suitable display can include the display 206, a display separate from the display 206 but still provided with the trailer hitch assembly 100 itself, a display provided with the trailer 50 but separate from the trailer hitch assembly 100, a display provided with the tow vehicle 10 but separate from the trailer hitch assembly 100, a display provided with or in communication with a telematics device, a display provided with a user's electronic device, such as a mobile electronic device, a tablet, or a computer, a display in communication with an information network or server, such as a cloud, or to any other suitable remote display separate from the trailer hitch assembly 100.

Figure 5:
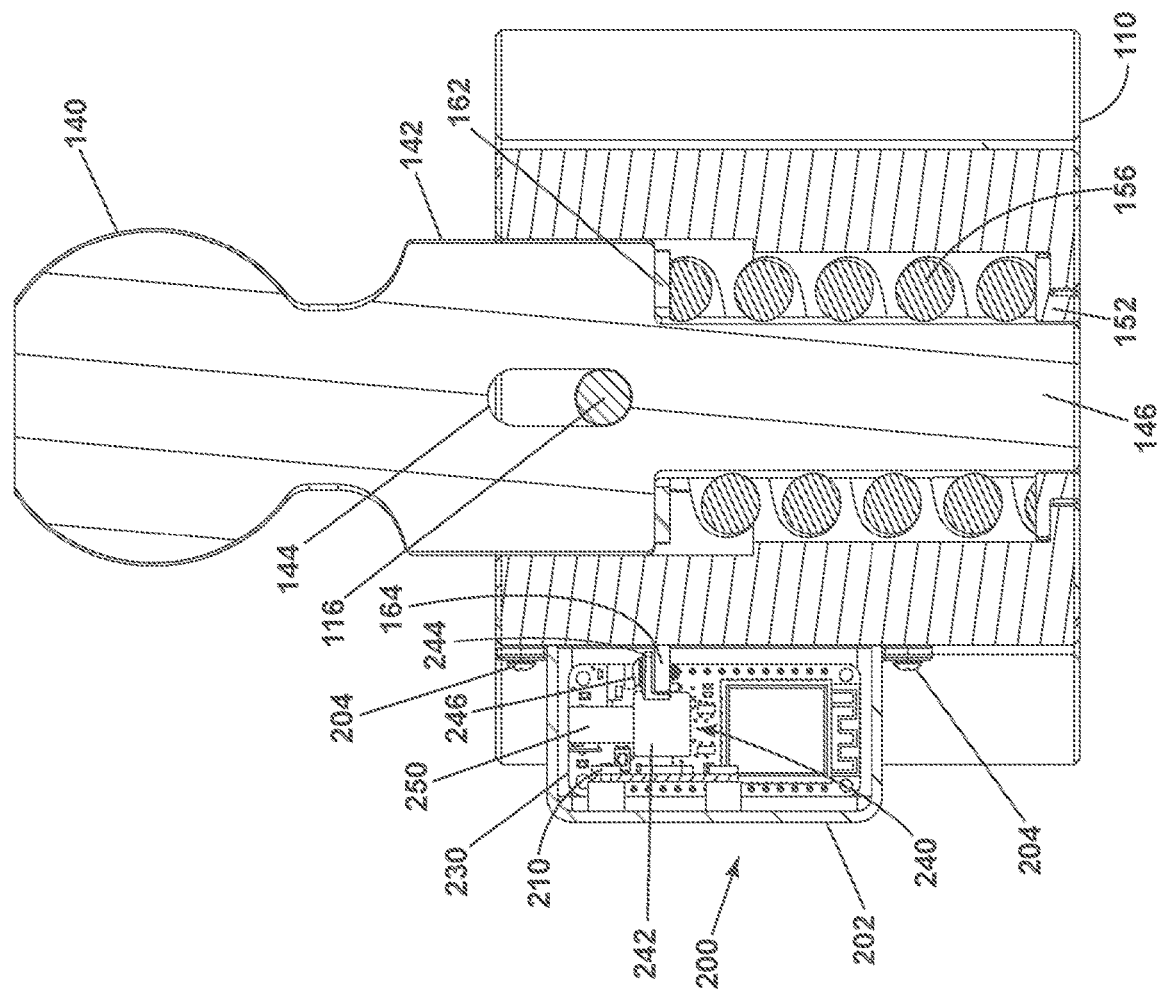
FIG. 5 is a cross-sectional view of a portion of the trailer hitch assembly of FIG. 2, including the hitch body and the sensor assembly, taken along line V-V of FIG. 2.

Turning now to FIG. 5, the attachment of the carrier 240 to the indicator pin 164 can be better seen. In the illustrated example, the flange 244 of the carrier 240 is attached to the indicator pin 164 by at least one fastener 246, non-limiting examples of which include a screw or a bolt.

In addition, the assembled position of the pin 116 extending through the fastener opening 114 in the hitch body 110 and through the fastener opening 144 in the hitch ball body 142 is illustrated. As shown, the fastener opening 144 has a height that is greater than the diameter of the pin 116 such that the vertical movement of the hitch ball body 142 within the interior cavity 112 is accommodated, while ensuring that the pin 116 and the hitch ball body 142 remain securely retained within the hitch body 110.

Figure 6:
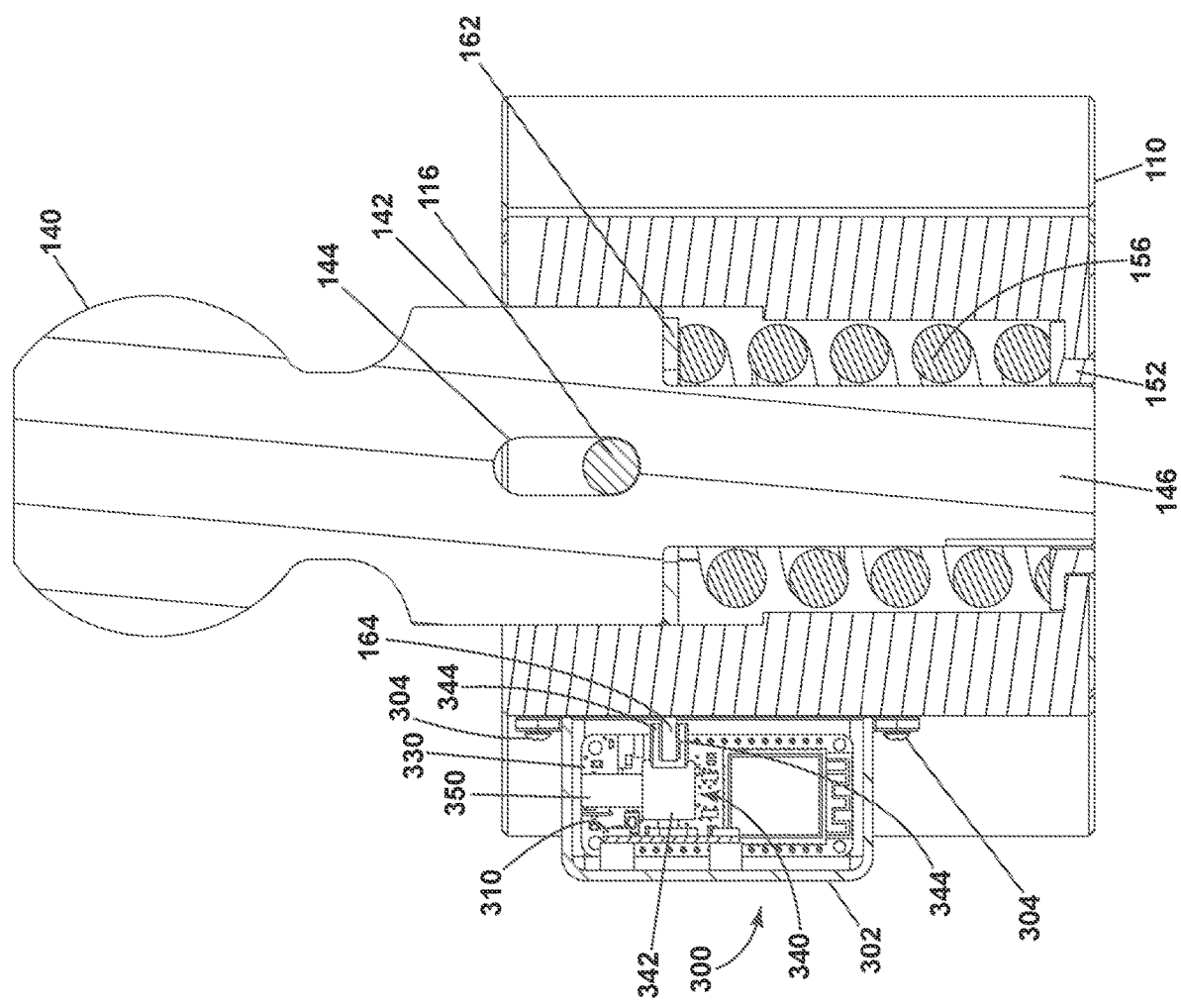
FIG. 6 is the cross-sectional view of the portion of the trailer hitch assembly of FIG. 5, including the hitch body and another example of a sensor assembly.

FIG. 6 illustrates another non-limiting example of a sensor assembly 300. The sensor assembly 300 is similar to the sensor assembly 200; therefore, like parts will be identified with like numerals in the 300 series, with it being understood that the description of the like parts of the sensor assembly 200 applies to the sensor assembly 300 unless otherwise noted.

The sensor assembly 300 is illustrated as being identical to the sensor assembly 200, with a sensor housing 302 mounted on the hitch body 110, such as by at least one fastener 304, and receiving a magnet sensor 310 and a PCB 330, except in the structure of a carrier 340 and the attachment of the carrier 340 to the indicator pin 164. Specifically, the structure of a bucket 342 and a magnet 350 can be the same as those of the sensor assembly 200, with only a flange 344 of the sensor assembly 300 differing in structure from the flange 244. In the carrier 340, the flange 344 comprises two flanges 344 spaced vertically apart to receive the indicator pin 164 between the flanges 344. Further, the flanges 344 can form a snap fit or an interference fit with the indicator pin 164, so no fastener is needed for the attachment of the carrier 340 to the indicator pin 164, though such a snap fit attachment is not limiting and the flanges 344 can be attached to the indicator pin 164 by any other suitable fastening method or structure.

Figure 7:
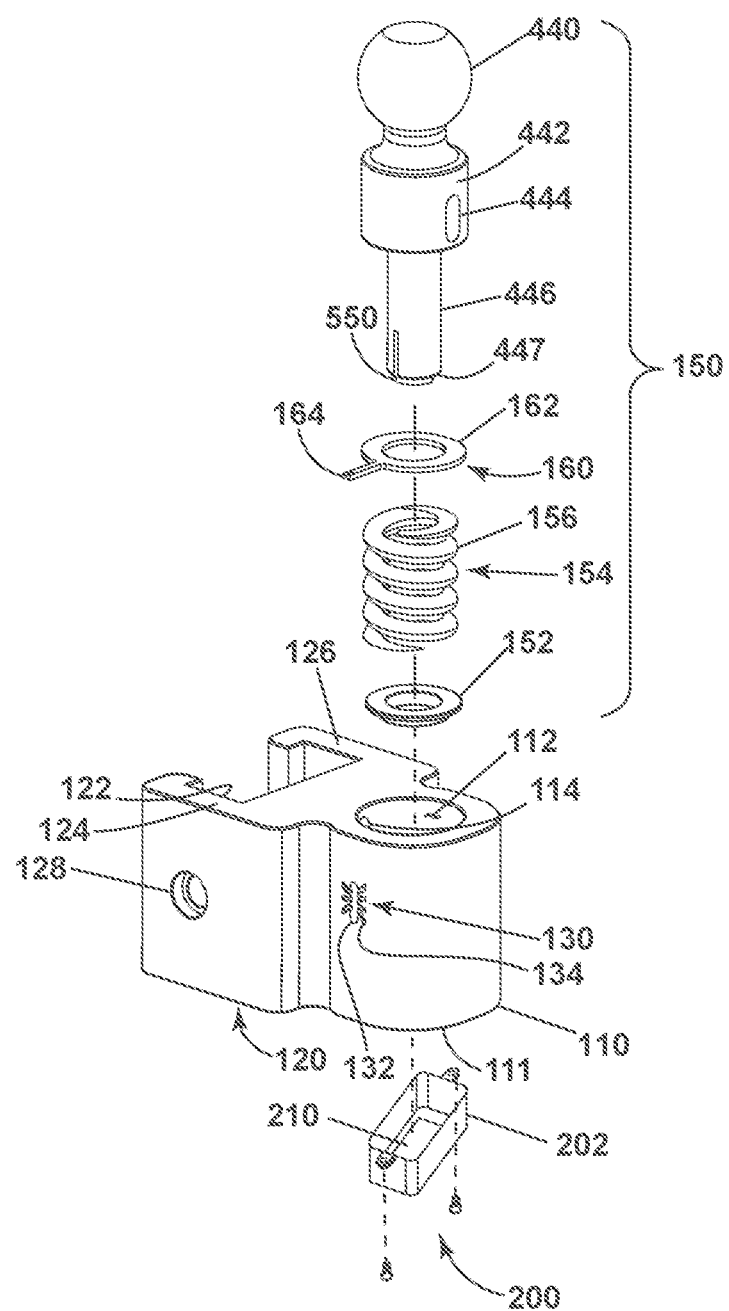
FIG. 7 is a partially exploded perspective view of a portion of the trailer hitch assembly of FIG. 2, including the hitch body, another example of a hitch ball, and the sensor assembly.

Turning now to FIG. 7, the partially exploded view of a portion of the trailer hitch assembly 100 shows the scale assembly 150 and the sensor assembly 200 exploded from the hitch body 110 to illustrate another non-limiting example of a hitch ball 440 that can be used with the scale assembly 150 in the trailer hitch assembly 100. The hitch ball 440 is similar to the hitch ball 140; therefore, like parts will be identified with like numerals increased by 300, with it being understood that the description of the like parts of the hitch ball 140 applies to the hitch ball 440 unless otherwise noted.

The hitch ball 440 is illustrated as being identical to the hitch ball 140, with the hitch ball 440 extending upwardly from a hitch ball body 442 defining a fastener opening 444 and a hitch ball stem 446 extending downwardly from the hitch ball body 442, opposite the hitch ball 440, except in that another non-limiting example of a magnet 550 is included. The magnet 550 is similar to the magnet 250; therefore, like parts will be identified with like numerals increased by 300, with it being understood that the description of the like parts of the magnet 250 applies to the magnet 550 unless otherwise noted.

The magnet 550 can have the same operative properties as the magnet 250 and still acts as a part of the sensor assembly 200, but is located outside of the sensor housing 202 and can have any suitable shape or profile, which may differ from the shape or profile of the magnet 250. In the illustrated example, the magnet 550 is provided at a lowermost end of the hitch ball stem 446, such as on a bottom surface 447 of the hitch ball stem 446, though it will be understood that such positioning is not limiting and that the magnet 550 can be provided at any suitable location, such as on a different portion of the hitch ball stem 446 or on a portion of the hitch ball body 442.

With the magnet 550 located exteriorly of the sensor housing 202, the rest of the sensor assembly 200 and the sensor housing 202 can be provided at a different location on the hitch body 110 to position the sensor housing 202, as well as the magnet sensor 210, adjacent and close to the magnet 550. In the illustrated example, when the magnet 550 is provided on the bottom surface 447 of the hitch ball stem 446, the sensor housing 202 can be provided at a lowermost end of the hitch body 110, such as on a bottom surface 111 of the hitch body 110. In the case that the magnet 550 were provided at a different position on the hitch ball stem 446 or the hitch ball body 442, the sensor housing 202 can likewise be provided at an adjacent or at least partially aligned positioned at any suitable point on the hitch body 110. While the battery 220 and the PCB 230 are not illustrated in the view of FIG. 7, for simplicity, it will be understood that the battery 220 and the PCB 230 can be included within the sensor housing 202, in addition to the magnet sensor 210, or the battery 220 and the PCB 230 can be included as a single part with the illustrated magnet sensor 210, as described previously.

By positioning the sensor housing 202 adjacent or near to the magnet 550, the magnet sensor 210 is adapted to detect a position of the magnet 250 relative to the magnet sensor 210, despite the magnet sensor 210 being located exteriorly of the interior cavity 112, while the magnet 550 is positioned at least partially within the interior cavity 112. In this way, with the magnet 550 no longer directly carried by the movable position indicator 160 via the indicator pin 164, the magnet 550 itself can serve as a movable position indicator, moving vertically within the interior cavity 112 between positions to be sensed by the magnet sensor 210, such that the proximity, the displacement, and/or the vertical position of the magnet 550 relative to the magnet sensor 210 can be used as an indicator or measure of weight applied to the hitch ball 440, in the same way as previously described with respect to the magnets 250, 350. While the position of the magnet 550 that is detected by the magnet sensor 210 is primarily described herein as a vertical or substantially vertical position of the magnet 550 relative to the magnet sensor 210, it will be understood that this is not limiting and it is also contemplated that the magnet sensor 210 can alternatively or additionally detect an angular position of the magnet 550 relative to the magnet sensor 210.

In the illustrated example, with the sensor housing 202 positioned away from the indicia 130, the side wall opening 132 and the scale 134 of estimated weights are fully visible to a user, such that the position of the indicator pin 164 within the side wall opening 132 and slidable along the scale 134 is viewable. The position of the indicator pin 164 relative to the scale 134 of estimated weights can serve as a visual indicator to the user that can be read as an estimated weight applied to the hitch ball 440, based on what number in the scale 134 of estimated weights the indicator pin 164 aligns with, in addition to and separate from a measure of weight applied to the hitch ball 440 determined or estimated using the sensor assembly 200.

Figure 8:
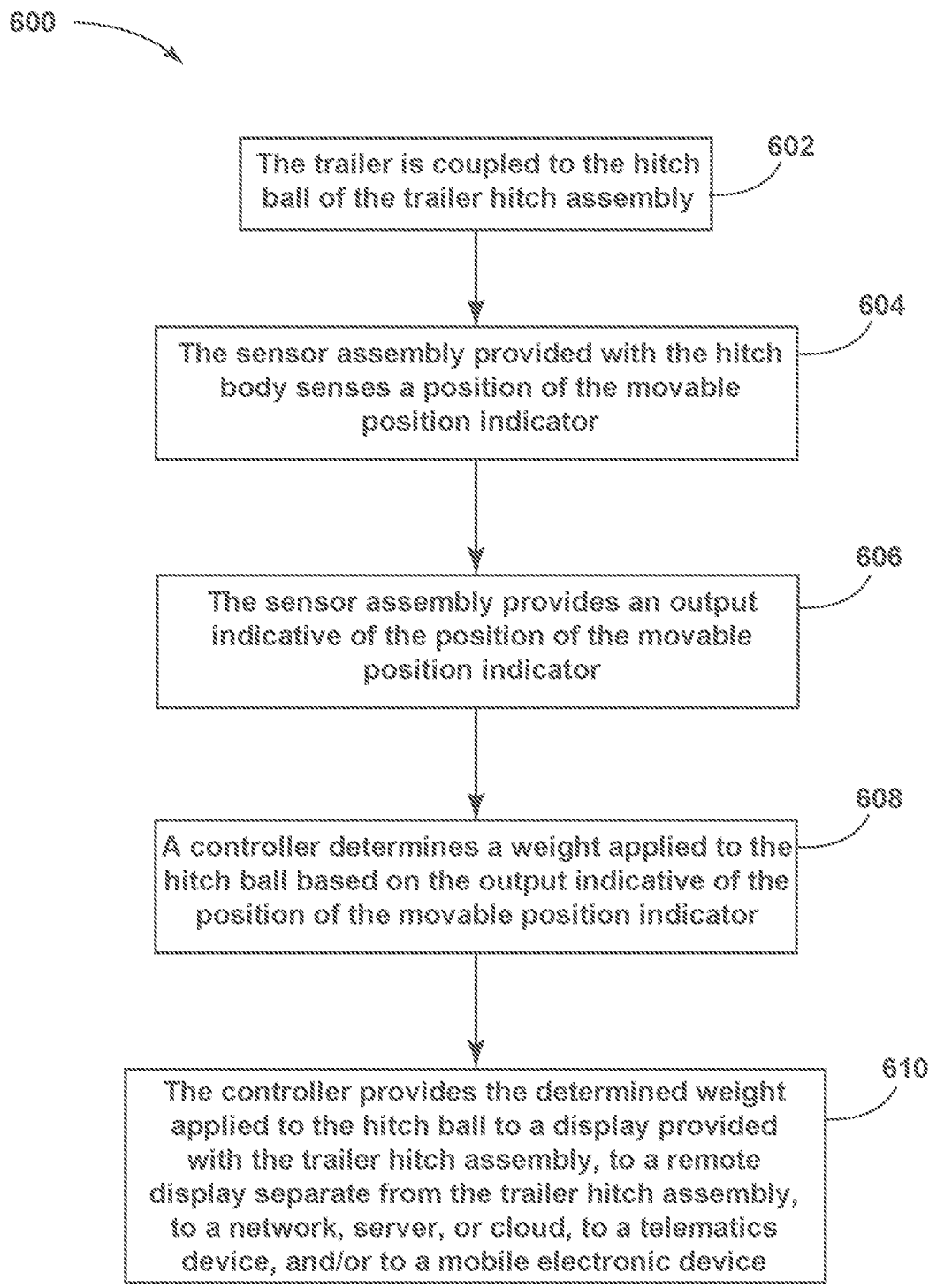
FIG. 8 is a schematic block diagram of a method of sensing a weight of a trailed vehicle coupled to the trailer hitch assembly.

Turning now to FIG. 8 and to the operation of the sensor assemblies 200, 300, a method 600 of sensing a weight of the trailer 50 coupled to the tow vehicle 10 by the trailer hitch assembly 100 is illustrated. At step 602, the trailer 50 is coupled to the hitch ball 140, 440 of the trailer hitch assembly 100, which in turn operably couples the trailer 50 with the movable position indicator 160 or the magnet 550 by the weight applied to the hitch ball 140, 440 by the trailer 50. The weight of the trailer 50 and its payload bears on the hitch ball 140, 440 to compress the spring 156, causing the position of the movable position indicator 160 or the magnet 550 within the interior cavity 112 to move, as indicated to the sensor assembly 200, 300 by the indicator pin 164 or the magnet 550. At step 604, the sensor assembly 200, 300 provided with the hitch body 110 senses a position of the movable position indicator 160 or the magnet 550 by operation of the magnet sensor 210, 310 to sense a position of the magnet 250, 350, 550 that can be coupled to the indicator pin 164 via the carrier 240, 340. At step 606, the sensor assembly 200, 300 provides an output indicative of the position of the movable position indicator 160 or the magnet 550 from the magnet sensor 210, 310, and optionally via the PCB 230, 330. At step 608, a controller, such as the PCB 230, 330, determines a weight applied to the hitch ball 140, 440 based on the output indicative of the position of the movable position indicator 160 or the magnet 550. At step 610, the controller, such as the PCB 230, 330, provides the determined weight applied to the hitch ball 140, 440 to a user, such as via the display 206, via a remote display separate from the trailer hitch assembly 100, via an information network or server, such as a cloud, via a telematics device, and/or to a mobile electronic device.

The aspects described herein set forth a sensor assembly for use in sensing a weight of a trailer by a trailer hitch assembly. Such a sensor assembly can be used for precise and convenient determination or estimation of a weight of a trailer and its payload that is attached to a tow vehicle. Such a determination can be made automatically and without requiring significant user intervention or initiation. In addition, the weight can then be provided to a user in a variety of convenient displays, such as to a display remote from the trailer, including to a display within the tow vehicle, or to a mobile electronic device, such as a user's cell phone, tablet, or computer. The determined weight can also be used by the tow vehicle and the trailer to optimize various parameters of the tow vehicle or trailer components for best towing performance, such as by automatically adjusting the braking mechanisms of the tow vehicle and/or the trailer based upon the determined weight.

It will also be understood that various changes and/or modifications can be made without departing from the spirit of the present disclosure. By way of non-limiting example, although the present disclosure is described for use with the sensor assembly being integrated with the trailer hitch assembly, it will be recognized that the sensor assembly for sensing weight of a trailer can be used in other configurations, including at other locations on the trailer, such as at a tongue of the chassis, at or near an axle or a wheel of the trailer, or associated with another part of the chassis or frame of the trailer.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A trailer hitch assembly configured for coupling a trailed vehicle with a motor vehicle, the trailer hitch assembly comprising:
   a hitch body at least partially defining an interior cavity configured for selectively receiving a hitch ball;
   a scale assembly at least partially provided within the interior cavity and having a movable position indicator with an indicator pin extending exteriorly of the interior cavity; and
   a sensor assembly provided with the hitch body and configured for detecting a position of the indicator pin and providing an output indicative of the position of the indicator pin.

2. The trailer hitch assembly of claim 1, further comprising a controller configured for receiving the output indicative of the position of the indicator pin and determining a weight applied to the hitch ball based on the output indicative of the position of the indicator pin.

3. The trailer hitch assembly of claim 1 wherein the scale assembly further comprises a compressible element received within the interior cavity and selectively compressible by the hitch ball.

4. The trailer hitch assembly of claim 3 wherein the position indicator is carried by the compressible element such that the position indicator moves within the interior cavity as the compressible element is compressed by weight applied to the hitch ball.

5. The trailer hitch assembly of claim 4 wherein the compressible element comprises a spring or a hydraulic assembly.

6. The trailer hitch assembly of claim 4 wherein the position indicator moves vertically within the interior cavity as the compressible element is compressed by weight applied to the hitch ball.

7. The trailer hitch assembly of claim 1 wherein the sensor assembly comprises:
   a housing defining an interior;
   a carrier coupled to and carried by the indicator pin for movement within the interior;
   a magnet at least partially received within and carried by the carrier; and
   a magnet sensor configured for detecting a position of the magnet.

8. The trailer hitch assembly of claim 7 wherein the carrier is coupled to the indicator pin by a fastener comprising a screw or a bolt.

9. The trailer hitch assembly of claim 7 wherein the carrier is coupled to the indicator pin by a snap fit attachment.

10. The trailer hitch assembly of claim 7 wherein the magnet sensor comprises a magnetometer.

11. The trailer hitch assembly of claim 7 wherein the housing is mounted on the hitch body.

12. The trailer hitch assembly of claim 7 wherein the housing is integrally formed with the hitch body.

13. The trailer hitch assembly of claim 1 wherein the indicator pin passes through a side wall of the hitch body to extend exteriorly of the interior cavity.

14. The trailer hitch assembly of claim 13 wherein the trailer hitch assembly further comprises an indicia provided on the side wall at the position where the indicator pin passes through the side wall.

15. The trailer hitch assembly of claim 14 wherein the indicia comprises a scale of estimated weights applied to the hitch ball along which the indicator pin is slidable.

16. The trailer hitch assembly of claim 2 wherein the controller provides the determined weight applied to the hitch ball to a remote display separate from the trailer hitch assembly or to a mobile electronic device.

17. A weight sensing assembly for use with a trailer hitch assembly configured for coupling a trailed vehicle with a motor vehicle and having a hitch body receiving a hitch ball and a scale assembly including a movable position indicator, the weight sensing assembly comprising:
   a sensor assembly coupled with the hitch body and configured for detecting a position of the movable position indicator and providing an output indicative of the position of the movable position indicator; and
   a controller configured for receiving the output indicative of the position of the movable position indicator and determining a weight applied to the hitch ball based on the output indicative of the position of the movable position indicator.

18. The weight sensing assembly of claim 17 wherein the sensor assembly comprises:
   a housing defining an interior;
   a carrier coupled to and carried by the movable position indicator for movement within the interior;
   a magnet at least partially received within and carried by the carrier; and
   a magnet sensor configured for detecting a position of the magnet.

19. A method of sensing a weight of a trailed vehicle coupled with a motor vehicle via a trailer hitch assembly, the method comprising:
   coupling the trailed vehicle with a hitch ball movably received within a hitch body of the trailer hitch assembly and operably coupled with a position indicator that is movable within the hitch body by weight applied to the hitch ball;
   sensing, by a sensor assembly provided with the hitch body, a position of the movable position indicator;
   providing, from the sensor assembly, an output indicative of the position of the movable position indicator; and
   determining, by a controller, a weight applied to the hitch ball based on the output indicative of the position of the movable position indicator.

20. The method of claim 19, further comprising:
   providing, from the controller, the determined weight applied to the hitch ball to a remote display separate from the trailer hitch assembly or to a mobile electronic device.

* * * * *